Aug. 15, 1939. H. A. HADLEY 2,169,465
PHOTOELECTRIC CELL CONTROL FOR SCALES
Filed June 29, 1936 2 Sheets-Sheet 1

INVENTOR
HARLAN A. HADLEY
BY
ATTORNEY

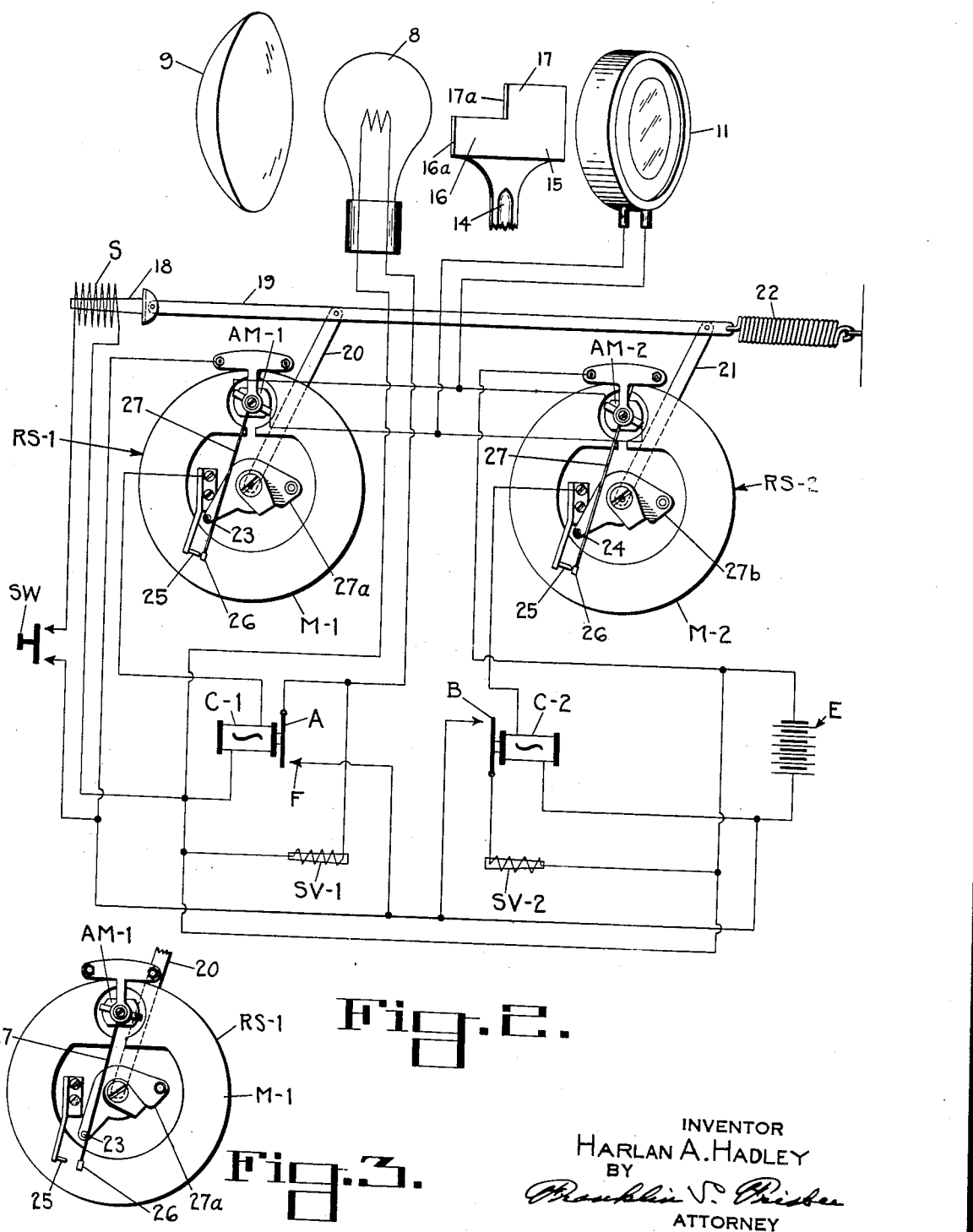

Patented Aug. 15, 1939

2,169,465

UNITED STATES PATENT OFFICE 2,169,465

PHOTOELECTRIC CELL CONTROL FOR SCALES

Harlan A. Hadley, St. Johnsbury, Vt., assignor to E. and T. Fairbanks and Company, St. Johnsbury, Vt., a corporation of Vermont Application June 29, 1936, Serial No. 88,060

15 Claims. (Cl. 249—63)

This invention relates to improvements in photoelectric cell controls for scales, having reference particularly to the control thereby of electrical devices associated with the weighing mechanism for effecting their operation.

An important object of the invention is to provide means operatively connected to the weighing mechanism which is adapted to automatically intercept and thereby control the volume of light falling on a radiant energy responsive device or light-sensitive cell and thus vary accordingly the amount of current delivered from the cell to operate a plurality of associated electrical devices.

Another object is to provide graduated means on the light interceptor, integral therewith and interposed between the source of light and the light-sensitive cell, whereby the volume of light falling on the cell is progressively reduced as the interceptor is advanced.

Another object is to provide means for resetting the associated electrical devices after their operation under control of the light-sensitive cell.

In order that the nature of my invention may be fully understood, I have illustrated certain embodiments of the invention in the accompanying drawings, in which:

Figure 2 is a diagram of the electric circuit and co-operative electrical and associated devices, and showing a preferred embodiment of my invention.

Figure 3 is a vertical elevation of one of the relays showing one of the movable contact arms with its contact in its open or operative position.

Figure 1:
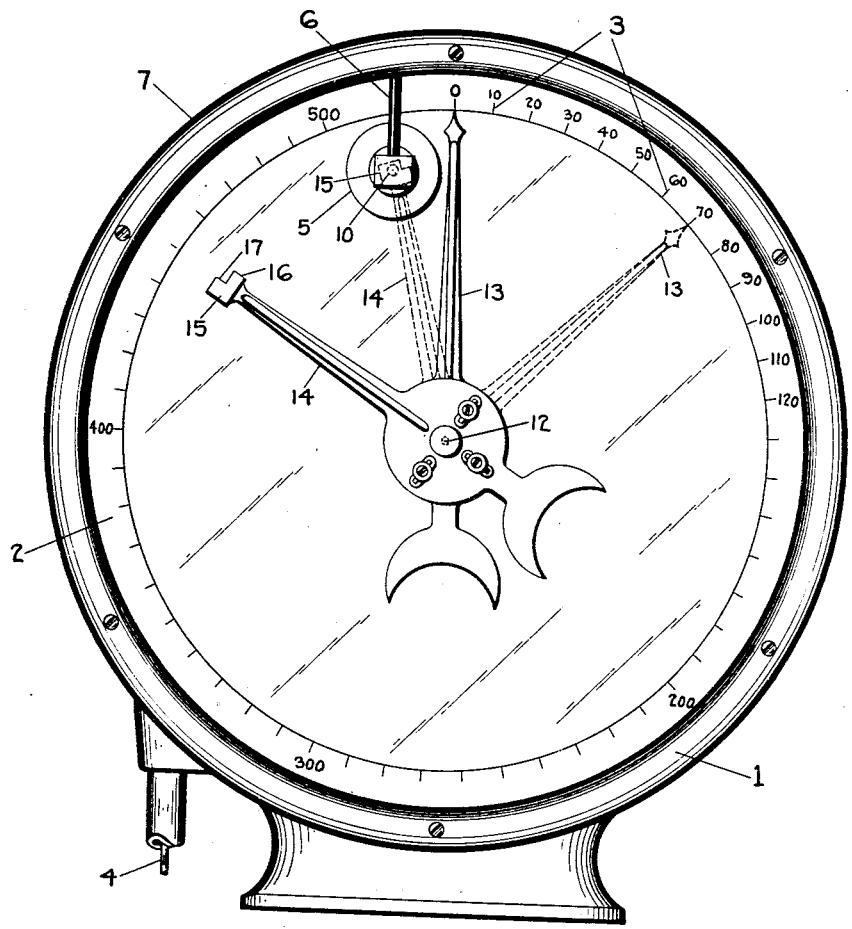
Figure 1 is a front elevation of the dial head of a scale showing the general position of the electric light and light-sensitive cell in relation to the dial, as well as the light interceptor carried by the indicator shaft, forming part of my invention.

Referring to the drawings 1 designates the dial head of a scale (not shown), which is provided with a dial 2, having the usual spaced graduations 3 indicating increments of the weight of the load as transmitted from the weighing mechanism by the draft rod 4. Disposed in front of the upper portion of the dial 2 is a tubular receptacle 5, which is attached by a tube depending from the dial rim 7, and carrying electric wires to an electric bulb or source of light 8 therein, the light beam from which is directed inwardly by a reflector 9 through a circular opening 10 in the dial 2, to a radiant energy responsive device or light-sensitive cell 11 mounted on the indicator mechanism frame (not shown) at the rear of the dial 2 and adjacent to the opening 10.

Mounted on the indicator shaft 12 is a main rotatable indicator 13 and an auxiliary interceptor arm 14 adjustable with relation to the indicator 13, carrying at its free end a stepped interceptor or cut-off member 15 operatively movable counter-clockwise in one direction between the light-sensitive cell and the electric bulb 8 and adapted in its operative position to intercept progressively the light beam emanating from the electric bulb 8 and falling on the light-sensitive cell 11. By this means the cell is caused to function at the exact operative position or graduation to which the indicator 13 and auxiliary interceptor arm 14 have been adjusted with relation to the desired weight indication on the dial 2, when reached by the indicator 13, as shown in dotted outline in Fig. 1.

The interceptor or cut-off member 15 is provided with a series of multiple notched steps 16 and 17 adapted to be moved successively in one direction so as to thereby perform their particular functions in one continuous movement. Each step is provided with a shoulder 16a and 17a respectively, the shoulders as they are brought into operative position acting to successively reduce the intensity of the light beam and thus cause the photoelectric cell to function accordingly in controlling electrically operated devices, such as are hereinafter described showing one application of the invention adapted to control the main and dribble flow of material from a container. As many notched steps may be employed as there are relays and co-operating controls for various electrically controlled devices such for example, as material supply valves described herein, in all of which the electrically controlled devices will be operated and closed by action of their co-operating notched steps intercepting the light beam in succession.

Disposed in the electrical circuit, as illustrated in Fig. 2, is a source of electricity E and a manually and momentarily operated switch SW, which serves to close the circuit and thus energize a solenoid S, thereby drawing inwardly the core piece 18. Pivotally connected to the core piece 18 is a horizontally disposed bar 19 having pivotally attached thereto spaced depending relay control arms 20 and 21 of spaced relays RS—1 and RS—2 which are microammeters of a standard type adapted to be controlled by the control bar 19 through its arms 22 and 21 and used in this instance as relays RS—1 and RS—2. The core piece 18 and the relay control arms 20 and 21 are held normally in their inoperative position by a retractile coiled spring 22 attached to the free end of the bar 19. The relay RS—1 has in the device shown a capacity of 50-70 micro-amperes, while the relay switch RS—2 has a capacity of 100-120 micro-amperes, but the capacities may be varied as required. Each of the control arms 20 and 21 is connected to a pivotally mounted member 27a or 27b provided with a lateral lug 23 and 24 respectively, while located below are two opposed magnetized steel contacts 25 and 26, the contact 25 being fixed and the contact 26 being held at the free end of a pivoted arm contact 27. The contact arm 27 is adapted to be moved by an armature AM—1 or AM—2 respectively to which the arm 27 is attached, in circuit with and energized by the photoelectric cell 11, each armature being disposed between the pole pieces of a circular permanent magnet M—1 and M—2 respectively, which serves to hold the armature and its contact arm 27 in its open or operative position as shown in Fig. 3. When the contact arm 27 is freed it is returned by a coiled spring (not shown), with its contact 26 carried by the armature, to its normal closed position as shown in Fig. 2, the magnetized contacts 25 and 26 attracting and engaging each other while the normal position of the contacts is in their attracted or closed position as shown in Fig. 2.

In the present instance the invention is shown as applied to the control of the feeding of materials from a source of supply (not shown), which materials may be of any freely flowing kind, such as granulated or liquid, under control of electrical devices operated by the light sensitive cell. Thus when the switch SW is momentarily operated the circuit is closed, lighting the bulb 8 and energizing the light-sensitive cell 11, while simultaneously the core piece 18 and the relay control bar 19 are drawn inwardly thereby swinging the relay control arms 20 and 21 and causing their lateral lugs 23 and 24 to engage and press inwardly the pivoted arm 27 of each relay switch respectively, thereby freeing the contacts 26 from the opposed contacts 25, the contacts of both the relays now being thus held open by the electrical energy transmitted by the light-sensitive cell from the light source 8. When the switch SW is released from its momentary contact, relay control arms 20 and 21 are returned to their normal positions by the de-energizing of solenoid S while the light source 8 is maintained through contact F of the relay C—1 (Fig. 2). The opening of the contacts 25 and 26 de-energizes two electrically controlled valve control relays C—1 and C—2, each of which is operatively controlled by the closing of its contactor arms A or B respectively, and adapted to control the operation of a solenoid dribble valve SV—1 and a solenoid main supply valve SV—2. The de-energizing of these two control relays C—1 and C—2 by the opening of the contacts 25 and 26 (Fig. 3) allows the contactor arms A and B respectively to be closed. In the case of the relay C—2 the closing of contactor arm B closes the circuit to the main supply valve SV—2, and energizes it, thus opening the valve SV—2, and allowing the main supply of material to flow freely therefrom. In the case of C—1, the closing of the contactor arm A closes the circuit to the dribble valve SV—1 and thereby energizes it, thus allowing the material to dribble through it. Further, the closing of the contactor arm A also energizes the light source 8.

As the indicator 13 with the auxiliary indicator 14 rotating therewith approaches the selected graduation on the dial 2, for example 70 lbs. indicating the weight of the material desired, and as the shoulder 16a of the first step 16 of the interceptor 15 carried by the auxiliary indicator 14 is advanced continuously in one direction into the path of the light beam, the intensity of the light beam is reduced, thus reducing the micro-amperage supplied to the relay RS—2. When the shoulder 16a of the first interceptor step 16 is so far advanced into the path of the light beam as to bring the notched shoulder 17a of the step 17 into its path, the interposition of the shoulder 17a in its initial movement acts to progressively reduce the micro-amperage below the point for which it is adjusted and thus causes the contact arm 27 in RS—2 to be closed, thereby closing the contacts 25 and 26 thereof and completing the circuit and energizing the control relay C—2, which in turn closes contact arm B, which opens the circuit to the solenoid main valve SV—2 de-energizing and closing it, thus stopping the main flow of material. However, the dribble valve SV—1 is still open and the material continues to flow therefrom at a much reduced rate, but as the shoulder 17a of the second step 17 of the interceptor 15 is advanced farther into the path of the light beam the intensity of the light affecting the light sensitive cell 11 is still further reduced and finally intercepted completely, thereby reducing the micro-amperage delivered to the relay RS—1 below its adjusted point required to hold the relay open, thereby closing the contacts 25 and 26 of this relay. The closing of these contacts completes the circuit to the control relay C—1 and thus energizes it, which in turn opens the contact arm A, de-energizing the light source 8 and the dribble supply valve SV—1, closing the valve and stopping the flow of material completely.

In the operation of the device and the electrical control of the various relays and solenoids, as shown in Fig. 2, the operation is initiated by pushing the push button of the switch SW momentarily, thereby energizing the solenoid S, which pulls forward the relay control bar 19 against the influence of the coiled spring 22. This movement of the relay control bar 19 swings the relay control arms 20 and 21 pivotally connected thereto in a counter-clockwise direction, the control arms being connected to pivoted members 27, each having protruding lugs 23 and 24 respectively which in operation engage the contact arms 27 and thus snap open the contacts 25 and 26, thereby closing the circuit to and de-energizing the relays C—1 and C—2. The relay C—1, when de-energized, completes the circuit to the light bulb 8 and lights it by means of the contact F (Fig. 2), while it also energizes the solenoid control dribble valve SV—1 and opens it, allowing a dribble flow of material to come therefrom. At the same time relay C—2 is de-energized and this in turn opens the solenoid control main supply valve SV—2 which permits the main supply of material to flow. The light bulb 8 now being illuminated, the light beam therefrom energizes the photo-cell 11, which causes the contact arm 27 of each relay with its co-operating lug 23 or 24 to swing to its limit under control of and carried by small rotatable armatures AM—1 and AM—2 respectively in circuit with and energized by the current from the photo-cell 11, the armatures being mounted in circular permanent magnets M—1 and M—2 respectively adapted to hold the contact arms in their open or operative position (Fig. 3). The push button of the switch SW is now released thereby de-energizing solenoid S, allowing the coiled spring to retract the relay control bar 19 and the lugs 23 and 24 through their control arms 20 and 21, back to their normal, inoperative positions (Fig. 2). The contact arms 27, however, under control of the energized armatures AM—1 and AM—2, remain in their extreme open positions, as shown in Figure 3, until the shoulder 16a of the step 16 of the notched light interceptor 15 starts to swing between the light bulb 8 and the photo-cell 11, thereby decreasing the amount of light, which consequently decreases the amount of energy generated by the photo-cell 11.

When the light beam directed on the photo-cell 11 is intercepted by the notched shoulder 17a of the step 17 the light beam is abruptly decreased to the point where the energy transmitted to the relay RS—2 by the photo-cell 11 is decisively reduced below 100 micro-amperes. Then the contact 26 carried by the contact arm 27 under control of the returning relay control bar 19 returns to engage the contact 25 thereby energizing relay C—2 (Fig. 2), which closes the circuit to the main supply valve SV—2, leaving the dribble valve SV—1 still open. When the upper notched step 17 of the light interceptor 15 moves completely between the light bulb 8 and the photo-cell 11 it entirely cuts off the light beam falling on the photoelectric cell 11. The flow of material, during the movement of the step 17, just dribbling onto the scale consequently causes the step 17 to move slowly and in a clockwise direction until it entirely cuts off the light beam, thereby cutting off entirely the energy produced and transmitted by the photoelectric cell 11 to a point below the capacity of 70 micro-amperes of the relay RS—1. This allows the contact 26 of the contact arm 27 of the relay RS—1 to engage the contact 25, which closes the circuit to and energizes the relay C—1, which in turn de-energizes the dribble valve SV—1, thus completely cutting off the dribble flow of material. Moreover, the action of relay C—1 at this time shuts off the circuit to the light bulb 8 and the light beam therefrom, thereby completing one cycle of operation of the apparatus.

It is to be noted that the application of the invention in the above example employing a light-sensitive cell and circuit for controlling in sequence the operation of a plurality of electrical devices, is only one of its many uses, such as the control of electric motors and conveyors, which would come within the scope of the invention.

I claim:

1. In a device of the character described, a source of light emitting a light beam, a radiant energy responsive device positioned in the path of the said light beam, a series of electrical devices of varying electrical capacities, each device being in a separate circuit with the radiant energy responsive device, and an integral multiple stepped interceptor adapted operatively to be moved step by step into the path of the light beam and thereby successively reduce the radiant energy emitted by the radiant energy responsive device at each successive step so as to thereby cause the closing at each step of the circuit to and thus operate the co-operating electrical device of sufficient electrical capacity to be responsive thereto.

2. In a device of the character described, a source of light emitting a light beam, a radiant energy responsive device positioned in the path of the said light beam, a series of electrical relays of varying electrical capacities in circuit with the radiant energy responsive device, and an integral multiple stepped interceptor adapted operatively to intercept the light beam and thereby causing a successive variation in the intensity of the emitted energy of the radiant energy responsive device as each step successively intercepts the light beam at predetermined operative points and thus effects the energizing of each associated electrical relay of such electrical capacity as to be responsive thereto.

3. In a device of the character described, an electric circuit, a source of light emitting a light beam, a light-sensitive cell opposed thereto in the said circuit, electrically operated relays in circuit with and controlled by the light-sensitive cell, weighing mechanism provided with a weight indicator, and means for successively varying the intensity of the said light beam and the consequent reduction of the emitted energy of the light-sensitive cell comprising an auxiliary interceptor arm co-operating with the weight indicator and provided with an interceptor plate having on one edge a series of multiple notched, stepped portions adapted to be moved under the influence of the load to successively intercept the light beam, one of the relays being adapted to be operated by the intercepting of the light beam by the first interceptor step, and the other relay by the succeeding interceptor step.

4. In a device of the character described, weighing mechanism, a weight indicator operable thereby, an auxiliary interceptor arm operatively associated with the weight indicator, a source of light emitting a light beam, a light-sensitive cell oppositely disposed to the source of light and energized by the said light beam transmitted therefrom, electrically operated relays of different electrical capacities in circuit with and controlled by the light-sensitive cell, and means for progressively intercepting the light beam comprising a multiple stepped member provided with a series of steps of varying dimensions and mounted on the said auxiliary interceptor arm and adapted in operation under the influence of the load to be moved and successively interposed between the said cell and the source of light and thus to reduce by successive steps the amount of light transmitted to the light-sensitive cell and consequently the radiant energy transmitted thereby, so as to control the said electrical relays accordingly.

5. In a device of the character described, weighing mechanism, a weight indicator operable thereby, an auxiliary interceptor arm operatively associated with the weight indicator and adjustable with relation thereto, a source of light emitting a light beam, a light-sensitive cell oppositely disposed to the source of light and energized by the said light beam transmitted therefrom, electrically operated relays of different electrical capacities in circuit with and controlled by the light sensitive cell, and means for successively intercepting the light beam comprising a stepped interceptor member mounted on the auxiliary interceptor arm and carrying an interceptor member provided on one edge with a series of ascending steps of varying magnitude adapted in operation under the influence of the load to be moved and interposed between the said cell and the source of light and thus to successively reduce the radiant energy transmitted by the cell so as to effect accordingly control of the operation of the said relays and then abruptly shut off the light beam.

6. In a device of the character described, weighing mechanism, a weight indicator operable thereby, an auxiliary interceptor arm operatively associated with the weight indicator, a source of light emitting a light beam, a light-sensitive cell oppositely disposed to the source of light and energized by the said light beam transmitted therefrom, electrically operated relays of varying electrical capacities in circuit with and controlled by the light-sensitive cell, and means for successively intercepting the light beam comprising an integral stepped member carried by the interceptor arm and having successive ascending steps of varying magnitude provided with intervening shoulders therebetween and mounted on the said auxiliary indicator, each shoulder being adapted in operation under the influence of the load to be successively moved and interposed between the said cell and the source of light and adapted to reduce the radiant energy transmitted thereby to selected points to control accordingly the operation of the relays and then to abrutly shut off the light beam.

7. In a device of the character described, weighing mechanism, a weight indicator operable thereby, an auxiliary interceptor arm operatively associated with the weight indicator, a source of light emitting a light beam, a light-sensitive cell oppositely disposed to the source of light and energized by the said light beam transmitted therefrom, integral means for successively intercepting the light beam comprising a notched, stepped member mounted on the said auxiliary interceptor arm provided with an intervening notched portion adapted in operation under the influence of the load to be moved between the said cell and the source of light and thus to effect successive reductions in the amount of light transmitted to the light-sensitive cell, thereby making an initial variation in and then a further variation in the amount of light transmitted to the said light-sensitive cell and consequently varying the radiant energy of the cell accordingly, a relay responsive to and operated by the initial variation in the radiant energy transmitted thereto by the said cell, and a co-operating relay responsive to and controlled by further variation in the radiant energy then transmitted thereto by the said cell.

8. In a device of the character described, weighing mechanism, a weight indicator operable thereby, an auxiliary interceptor arm operatively associated with the weight indicator, full flow material electrically controlled feeding means, dribble flow material electrically controlled feeding means, a source of light emitting a light beam, a light-sensitive cell oppositely disposed to the source of light and energized by the said light beam transmitted therefrom, integral means for successively intercepting the light beam comprising a notched, stepped member mounted on the said auxiliary interceptor arm and adapted in operation under the influence of the load to be moved between the said cell and the source of light and thus to effect successive reductions in the amount of light transmitted to the light sensitive cell, making an initial variation in and then a further variation in the amount of light transmitted to the said light-sensitive cell by the interposing of the first step of the stepped member into the light beam path and consequently varying the radiant energy of the cell accordingly, a relay responsive to and operated by the initial variation in the radiant energy transmitted thereto by the said cell and adapted to control the operation of the said full flow feeding means, and a co-operating relay responsive to and controlled by further variation in the radiant energy then transmitted thereto by the cell due to the interposing of the stepped member into the light beam path, whereby the operation of the dribble flow feeding means is controlled.

9. In a device of the character described, weighing mechanism, a weight indicator operable thereby, an auxiliary interceptor arm operatively associated with the weight indicator, full flow material electrically controlled feeding means, dribble flow material electrically controlled feeding means, a source of light emitting a light beam, a light-sensitive cell oppositely disposed to the source of light and energized by the said light beam transmitted therefrom, integral means for successively intercepting the light beam comprising a notched, stepped member mounted on the said auxiliary interceptor arm and adapted in operation under the influence of the load to be moved between the said cell and the source of light and thus to effect successive reductions in the amount of light transmitted to the light-sensitive cell, thereby making an initial variation in and then a further variation in the amount of light transmitted to the said light-sensitive cell by interposing the first step of the stepped member into the light beam path and consequently varying the radiant energy of the cell accordingly, a relay responsive to and operated by the initial variation in the radiant energy transmitted thereto by the said cell and adapted to control the operation of the said full flow feeding means, and a co-operating relay responsive to and controlled by further variation in the radiant energy then transmitted thereto by the cell due to the interposing of the succeeding step of the stepped member into the light path, whereby the operation of the dribble flow feeding means is controlled.

10. In a device of the character described, weighing mechanism, a weight indicator operable thereby, an auxiliary interceptor arm operatively associated with the weight indicator, a source of light emitting a light beam, a light-sensitive cell oppositely disposed to the source of light and energized by the said light beam transmitted therefrom, means for successively intercepting the light beam comprising a notched, stepped member carried by the said auxiliary interceptor arm provided with a series of successive steps adapted in operation under the influence of the load to be moved successively between the said cell and the source of light and thus to successively reduce the amount of light transmitted to the light-sensitive cell, and a plurality of relays of varying electrical capacities so disposed in the circuit with the light-sensitive cell and the source of light that the variation in the radiant energy of the light-sensitive cell produced by the successive intercepting of the light beam effects successively the operation of the said relays.

11. In a device of the character described, weighing mechanism, a weight indicator operable thereby, an auxiliary interceptor arm operatively associated with the weight indicator, a source of light emitting a light beam, a light-sensitive cell oppositely disposed to the source of light and illuminated by the said light beam, means for successively intercepting the light beam comprising a cut-off plate carried by the said auxiliary interceptor arm provided on one end with a plurality of steps, each step being adapted to successively intercept the light beam emanating from the source of light and to thus vary the intensity of the light beam and the consequent radiant energy transmitted by the light-sensitive cell, and a plurality of electrical relays one relay being controlled by the initial variation in the radiant energy of the said cell and the other by the subsequent variation of the radiant energy of the cell.

12. In a device of the character described, weighing mechanism, a weight indicator operable thereby, an adjustable auxiliary interceptor arm operatively associated with the weight indicator, a source of light emitting a light beam, a light-sensitive cell oppositely disposed to the source of light and energized by the said light beam transmitted therefrom, integral means for successively intercepting the light beam comprising a stepped member provided with a series of successive steps and carried by the said auxiliary interceptor arm and adapted in operation under the influence of the load to be moved between the said cell and the source of light and thus to effect successive reductions in the amount of light transmitted to the light-sensitive cell, and a plurality of electrically operated relays of varying electrical capacities, in circuit with the light-sensitive cell and adapted to be affected accordingly by the initial and subsequent variations in the radiant energy transmitted from the cell under control of the interceptor stepped member, each relay being provided with a pivoted control arm adapted to control the opening and closing of the said relay, an operating control bar pivotally connected to each of the said control arms, and a solenoid having its core piece secured to the said operating bar and under control of a manually operated switch.

13. In a device of the character described, weighing mechanism, a weight indicator operable thereby, an adjustable auxiliary interceptor arm operatively associated with the weight indicator, a source of light emitting a light beam, a light-sensitive cell oppositely disposed to the source of light and energized by the said light beam transmitted therefrom, integral means for successively intercepting the light beam comprising a stepped member provided with a series of successive steps and carried by the said auxiliary interceptor arm and adapted in operation under the influence of the load to be moved between the said cell and the source of light and thus to effect successive reductions in the amount of light transmitted to the light-sensitive cell, a plurality of electrically operated relays of varying electrical capacities in circuit with the light-sensitive cell and adapted to be affected accordingly by the initial and subsequent variations in the radiant energy transmitted from the cell under control of the interceptor stepped member, each relay being provided with a pivoted control arm adapted to control the opening and closing of the said relay, an operating control bar pivotally connected to each of the said control arms, a solenoid having its core piece secured at its inner end to the said operating bar and under control of a manually operated switch, and a retractile coiled spring attached to the outer end of the said bar and adapted to retract the said bar and co-operating control arms to their inoperative positions upon the shutting off of the current.

14. In a device of the character described, weighing mechanism, a rotatable weight indicator carried by the weighing mechanism, an adjustable auxiliary interceptor arm operatively associated with the weight indicator, a material supply valve for permitting a full flow and a dribble flow of material, electrically operated means for controlling the operation of the said valve, a source of light emitting a light beam, a light-sensitive cell disposed in a position opposite to the source of light and energized by the said light beam transmitted therefrom, and integral means for successively intercepting the light beam comprising an interceptor plate carried by the upper end of the said auxiliary interceptor arm and provided with a plurality of successive steps adapted to successively intercept the light beam, the intercepting of the light beam by each step being adapted to reduce the radiant energy transmitted by the light-sensitive cell and thus effect successively the operation of the electrically operated material flow control means in opening and shutting off the full and dribble flow of the said supply valve.

15. In a device of the character described, weighing mechanism, a rotatable weight indicator carried by the weighing mechanism, an auxiliary interceptor arm operatively adjustable with relation to the weight indicator, material feeding means co-operating with the weighing mechanism under control of electrically controlled supply valves and adapted to feed material in full flow and dribbe flow, electrically operated means for controlling the operation of the said valves, a source of light emitting a light beam, a light-sensitive cell disposed in a position opposite to the source of light and energized by the said light beam transmitted therefrom, and integral means for successively intercepting the light beam comprising an interceptor plate carried by the upper end of the said auxiliary interceptor arm and provided with a plurality of successive steps adapted to successively intercept the light beam, the intercepting of the light beam by each step being adapted to reduce accordingly the radiant energy transmitted by the light-sensitive cell and thus effect in turn, as each successive interceptor stepped member reaches its operative position, the operation of the electrically operated relays, thereby controlling first the said material flow control means in opening and then shutting off the full and dribble flow of the said supply valves.

HARLAN A. HADLEY.